United States Patent
Park et al.

(10) Patent No.: US 10,129,736 B2
(45) Date of Patent: Nov. 13, 2018

(54) METHOD AND DEVICE FOR UPDATING PROFILE MANAGEMENT SERVER

(71) Applicant: Samsung Electronics Co., Ltd., Gyeonggi-do (KR)

(72) Inventors: Jonghan Park, Gyeonggi-do (KR); Duckey Lee, Seoul (KR); Sangsoo Lee, Gyeonggi-do (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 14/802,533

(22) Filed: Jul. 17, 2015

(65) Prior Publication Data

US 2016/0021529 A1  Jan. 21, 2016

(30) Foreign Application Priority Data

Jul. 17, 2014  (KR) .................. 10-2014-0090582

(51) Int. Cl.
*H04M 1/66* (2006.01)
*H04W 8/20* (2009.01)
(Continued)

(52) U.S. Cl.
CPC .......... *H04W 8/205* (2013.01); *H04W 12/04* (2013.01); *H04W 12/08* (2013.01); *H04W 8/183* (2013.01)

(58) Field of Classification Search
None
See application file for complete search history.

(56) References Cited

U.S. PATENT DOCUMENTS 9,009,475 B2  4/2015  Hauck et al.
2009/0117875 A1  5/2009  Weigele et al.
(Continued)

FOREIGN PATENT DOCUMENTS

WO  WO 2014/035092 A1  3/2014
WO  WO 2014/095040 A1  6/2014
WO  WO 2016/010387 A1  1/2016

OTHER PUBLICATIONS

International Search Report dated Oct. 26, 2015 in connection with Internaional Application No. PCT/KR2015/007413; 3 pages.
(Continued)

*Primary Examiner* — German Viana Di Prisco

(57) ABSTRACT

A method to converge a $5^{th}$-Generation (5G) communication system to support higher data rates beyond a $4^{th}$-Generation (4G) system with a technology for Internet of Things (IoT) is provided. This disclosure may be applied to intelligent services based on the 5G communication technology and the IoT-related technology, e.g., smart home, smart building, smart city, smart car, connected car, health care, digital education, smart retail, security/safety services.
A method of transmitting and updating modified information to a profile management server (SM-SR) when a modification is made to information stored in an eUICC that is a security module embedded in a terminal is provided. The present disclosure relates to a method to update a profile management server to enable profile management using OTA technology when a modification is made to data stored in an MNO-SD that is a unique area of each mobile network operator of a profile stored in an eUICC.

20 Claims, 14 Drawing Sheets

(51) Int. Cl.
*H04W 12/04* (2009.01)
*H04W 12/08* (2009.01)
*H04W 8/18* (2009.01)

(56) References Cited

U.S. PATENT DOCUMENTS

| | | |
|---|---|---|
| 2012/0260090 A1 | 10/2012 | Hauck et al. |
| 2014/0087790 A1 | 3/2014 | Babbage et al. |
| 2014/0237101 A1* | 8/2014 | Park ................ H04L 67/303 709/223 |
| 2015/0271173 A1 | 9/2015 | Seo et al. |
| 2015/0281964 A1* | 10/2015 | Seo ................ H04L 63/102 726/9 |
| 2015/0334552 A1* | 11/2015 | Li ................ H04W 4/005 370/329 |
| 2015/0350881 A1 | 12/2015 | Weiss et al. |
| 2017/0077975 A1* | 3/2017 | Wang ................ G06F 15/177 |

OTHER PUBLICATIONS

Written Opinion of the International Searching Authority dated Oct. 26, 2015 in connection with Internaional Application No. PCT/KR2015/007413; 7 pages.
GSM Association; "Embedded SIM Remote Provisioning Architecture"; GSMA; Version 1.1; Dec. 17, 2013; 85 pages.

* cited by examiner

METHOD AND DEVICE FOR UPDATING PROFILE MANAGEMENT SERVER

CROSS-REFERENCE TO RELATED APPLICATION AND CLAIM OF PRIORITY

The present application is related to and claims benefit under 35 U.S.C. § 119(a) of Korean Patent Application No. 10-2014-0090582, filed on Jul. 17, 2014, which is hereby incorporated by reference for all purposes as if fully set forth herein.

TECHNICAL FIELD

The present disclosure relates to a technology of updating modified information to a server that manages mobile communication subscriber information when a modification is made to information stored in an embedded UICC (eUICC) that is non-detachably embedded in a terminal instead of a conventional universal integrated circuit card (UICC).

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A universal integrated circuit card (UICC), which is a smart card inserted into a mobile communication terminal, stores personal information of a mobile communication subscriber, such as network access authentication information, a phone number list, and an SMS, and performs subscriber authentication and traffic security key generation when a connection is made to a mobile communication network, such as GSM, WCDMA, LTE, etc., thereby making it possible to stably use mobile communication. The UICC may be embedded with a communication application, such as a subscriber identification module (SIM), a universal SIM (USIM), an IP multimedia SIM (ISIM), etc., according to the type of a mobile communication network to which a subscriber connects. In addition, the UICC provides a higher level security function for loading various applications, such as an electronic wallet, ticketing, an electronic passport, etc.

FIG. 1 schematically illustrates an example connection method of a mobile communication network by a detachable UICC that can be inserted into and detached from a terminal and a connection method of a mobile communication network by an embedded UICC (eUICC) embedded in a terminal according to this disclosure.

Referring to FIG. 1, in the connection method (left side) of a mobile communication network by an existing detachable UICC, a UICC (USIM) is inserted into a terminal (101), and then a connection is made to a mobile network operator (MNO) using various communication applications embedded in the UICC, such a SIM, a USIM, an ISIM, etc., according to the type of the mobile communication network (102), thereby receiving a mobile communication service.

In contrast, in the connection method (right side) of a mobile communication network using an eUICC (eSIM), a profile is remotely installed first using On The Air (OTA) technology based on a short message service (SMS). To this end, a connection is made to MNO2 using a provisioning profile which is pre-stored in the eUICC (103). When a user of a terminal downloads an operating profile of an MNO to which he/she has subscribed and installs the operating profile (104), the terminal may connect to a mobile communication network (105).

FIG. 2 is an example schematic diagram for explaining a process of installing a profile using the eUICC of FIG. 1 according to this disclosure.

Referring to FIG. 2, a terminal 200 for installation of a profile includes a controller 201 and an eUICC 202. When a user applies for the use of a mobile communication network of a mobile network operator (MNO), the MNO 220 makes a request for creating a profile to a subscription manager (SM) server 210 that creates and manages a profile to be installed in the eUICC 202 of the terminal 200. Specifically, the MNO 220 requests a subscription manager data preparation (SM-DP) to create a profile, and the SM-DP 211 creates a profile, namely, a SIM application which is packaged in a software format (SIM Creation). The SM-DP 211 transfers, to a subscription manager secure routing (SM-SR) 212, the created profile (SIM) in an encrypted form. The SM-SR 212 transmits an SMS as a trigger for profile downloading to an MSISDN of the terminal 200 to which the eUICC 202 is mounted based on OTA technology. At this time, an MSISDN of a provisioning profile, which is a profile pre-loaded in the eUICC 202, is used in the transmission of the SMS. The controller 201 of the terminal 200 receiving the SMS forwards, to the eUICC 202, the SMS loaded into a C-APDU packet format which is defined in the ISO-7816 standard. The C-APDU for this purpose is referred to as ENVELOPE (SMS-PP DOWNLOAD) and is defined as a method for triggering an OTA session using an SMS in the 3GPP standard. The eUICC 202 receiving the ENVELOPE (SMS-PP DOWNLOAD) C-APDU extracts the SMS by parsing it and decodes data fields of the corresponding SMS using an OTA key thereof. The decoded data includes the IP address of the SM-SR server and a KVN value of an OTA key value for making an OTA session with the SM-SR server, and the eUICC 202 creates a secure channel along with the SM-SR 212 by utilizing the decoded data, download the profile created by the SM-DP 211, and decode the downloaded profile using an OTA key to preserve the decoded profile in the interior of the eUICC 202. After the profile is installed, the corresponding profile is managed using the OTA key of the MNO 220, and the contents modified by the management cannot be opened to the outside for security reasons.

FIG. 3 is an example diagram for explaining problems of the related art to be solved according to this disclosure. In FIG. 3, a description will be made under the assumption that a profile has been installed in an eUICC of a terminal through the process of FIG. 2.

Referring to FIG. 3, eUICC related information, such as the phone number of the terminal 330, is modified. Specifically, in step 301, the information including the phone number (MSISDN) of the terminal 330 is modified by a selection of a user or a determination of an MNO 300. In more detail, the MNO 300 remotely modifies the information of the eUICC in the terminal 330 using a unique OTA key thereof. Or, according to step 302, the user directly selects a profile to which he/she wants to connect through a UI of the terminal 330 and switch an operating profile from an existing profile to another profile. The process of switching the profile is a process of switching the existing profile to a disabled state and switching a new profile to an enabled state. At this time, the existing profile is also deleted.

In cases where the information such as the MSISDN of the terminal is modified according to step 301 or 302, the MNO 300 and the eUICC know about the modified information, but an SM-DP 310 or an SM-SR 320 that actually manages a profile fails to receive an update on the modified information so that the MNO 300 may not perform profile management based on OTA technology afterward.

SUMMARY

To address the above-discussed deficiencies, it is a primary object to provide a method of transmitting and updating modified information to an SM-SR, which is a profile management server, when a modification is made to information stored in an eUICC of a terminal.

More specifically, an aspect of the present disclosure is to provide a method and device for updating modified information to an SM-SR when a modification is made to data stored in an MNO-SD which is a unique area of each mobile network operator of a profile stored in an eUICC.

In accordance with one aspect of the present disclosure, there is provided a method of updating a profile management server of a terminal having an embedded universal integrated circuit card (eUICC) embedded therein. The method includes determining whether information stored in a secured area of a profile stored in the eUICC is modified. The method also includes creating an update request message of the profile management server which includes the modified information in cases where the determination result shows that the information stored in the secured area has been modified. The method further includes transmitting the created update request message to the profile management server, wherein the information stored in the secured area is able to be modified using a unique encryption key of a mobile network operator (MNO) of the profile.

A terminal having an embedded universal integrated circuit card (eUICC) embedded therein for updating a profile management server, according to an embodiment of the present disclosure is provided. The terminal includes a communication unit that performs data communication. The terminal also includes a controller that determines whether information stored in a secured area of a profile stored in the eUICC is modified, creates an update request message of the profile management server which includes the modified information in cases where the determination result shows that the information stored in the secured area has been modified, and transmits the created update request message to the profile management server, wherein the information stored in the secured area is able to be modified using a unique encryption key of a mobile network operator (MNO) of the profile.

A method of updating a server for managing a profile stored in an embedded universal integrated circuit card (eUICC) embedded in a terminal, according to an embodiment of the present disclosure is provided. The method includes receiving an update request message of profile related information. The method also includes extracting the profile related information included in the received update request message. The further includes renewing pre-stored profile related information on the basis of the extracted profile related information, wherein the profile related information is stored in a secured area of the profile, and the secured area is changed using a unique encryption key of a mobile network operator (MNO).

A server for managing a profile stored in an embedded universal integrated circuit card (eUICC) embedded in a terminal, according to an embodiment of the present disclosure is provided. The server includes a communication unit that performs data communication. The server also includes a controller that receives an update request message of profile related information, extracts the profile related information included in the received update request message, and renews pre-stored profile related information on the basis of the extracted profile related information, wherein the profile related information is stored in a secured area of the profile, and the secured area is changed using a unique encryption key of a mobile network operator (MNO).

A method of updating a profile management server by a server for creating a profile for an embedded universal integrated circuit card (eUICC) embedded in a terminal, according to an embodiment of the present disclosure is provided. The method includes receiving an update request message for profile related information of the profile management server from a mobile network operator (MNO). The method also includes forwarding the received update request message to the profile management server, wherein the update request message includes modified profile related information, and the profile related information is able to be modified using a unique encryption key of the MNO.

A profile creation server for updating a profile management server of an embedded universal integrated circuit card (eUICC) embedded in a terminal, according to an embodiment of the present disclosure is provided. The profile creation server includes a communication unit that performs data communication. The profile creation server also includes a controller that receives an update request message for profile related information of the profile management server from a mobile network operator (MNO) and forwards the received update request message to the profile management server, wherein the update request message includes modified profile related information, and the profile related information is able to be modified using a unique encryption key of the MNO.

According to the various embodiments, even when information stored in an eUICC of a terminal is modified, the modified information can be updated to an SM-SR so that profile management is possible afterward.

Further, according to the present disclosure, since a terminal, an MNO, and an SM-DP can independently perform updating, an update on the modification of information in a profile can be accomplished despite some communication problems.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
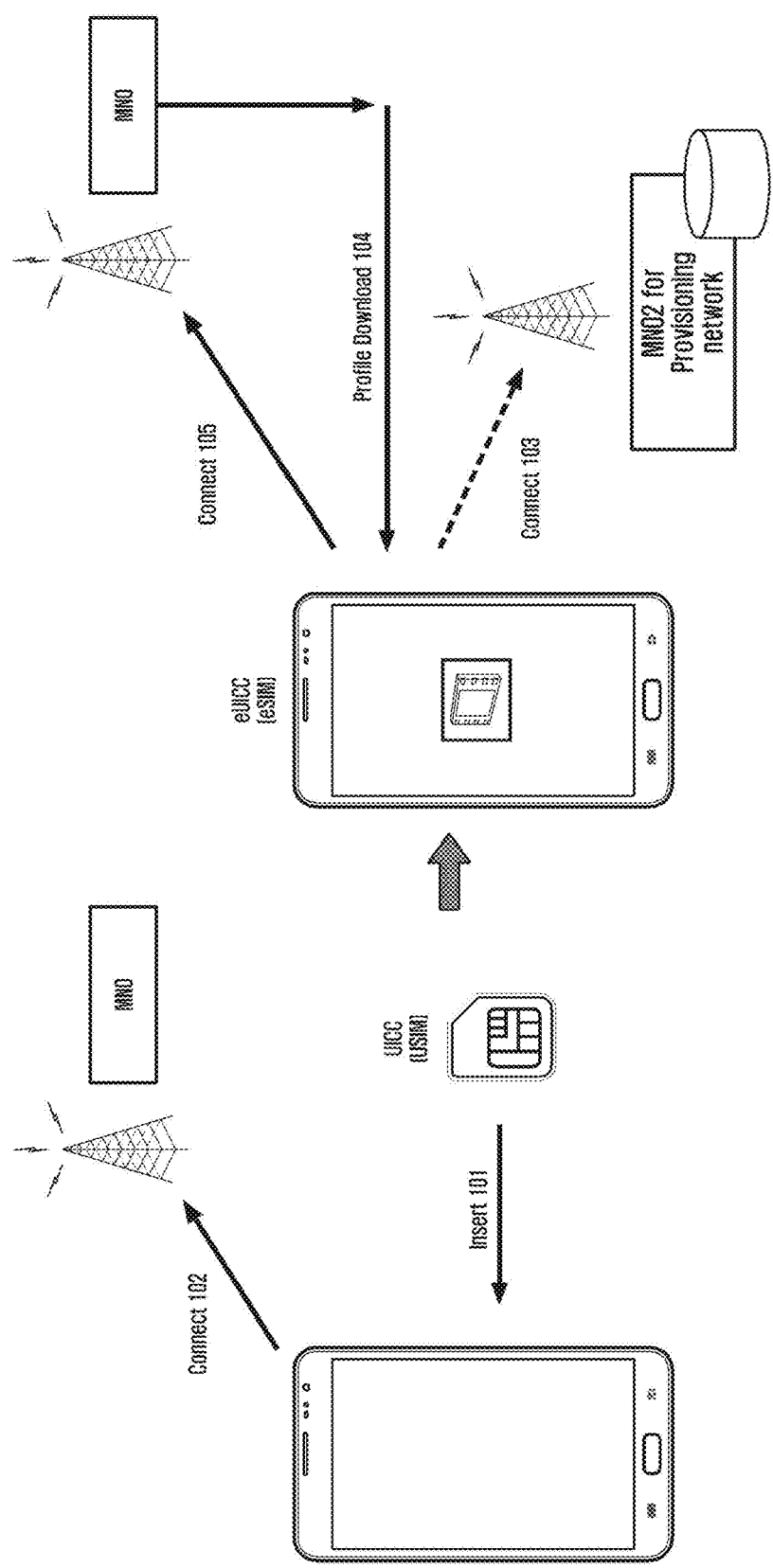
FIG. 1 is an example schematic diagram illustrating a connection method of a mobile communication network by a detachable UICC in the art that can be inserted into and detached from a terminal and a connection method of a mobile communication network by an embedded UICC (eUICC) embedded in a terminal according to this disclosure.
Figure 2:
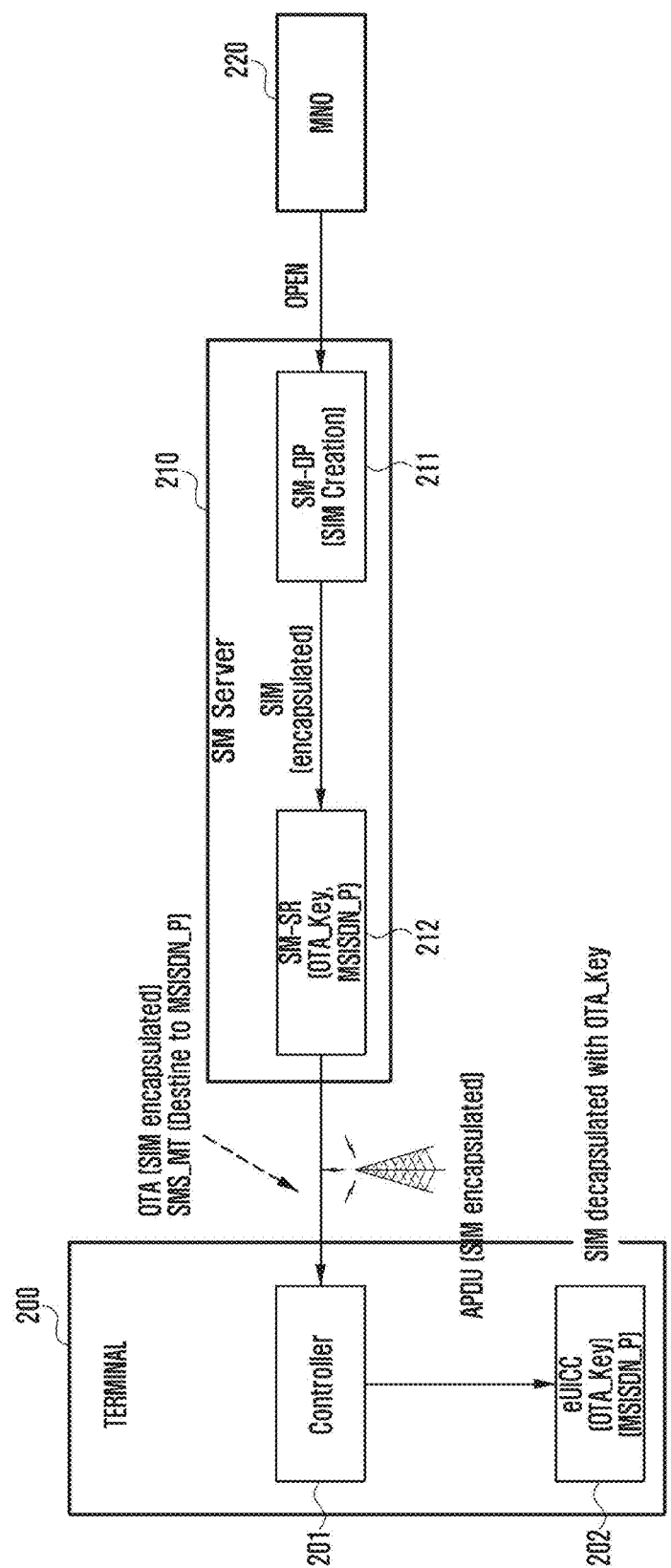
FIG. 2 is an example schematic diagram for explaining a process of installing a profile using the eUICC of FIG. 1 according to this disclosure.
Figure 3:
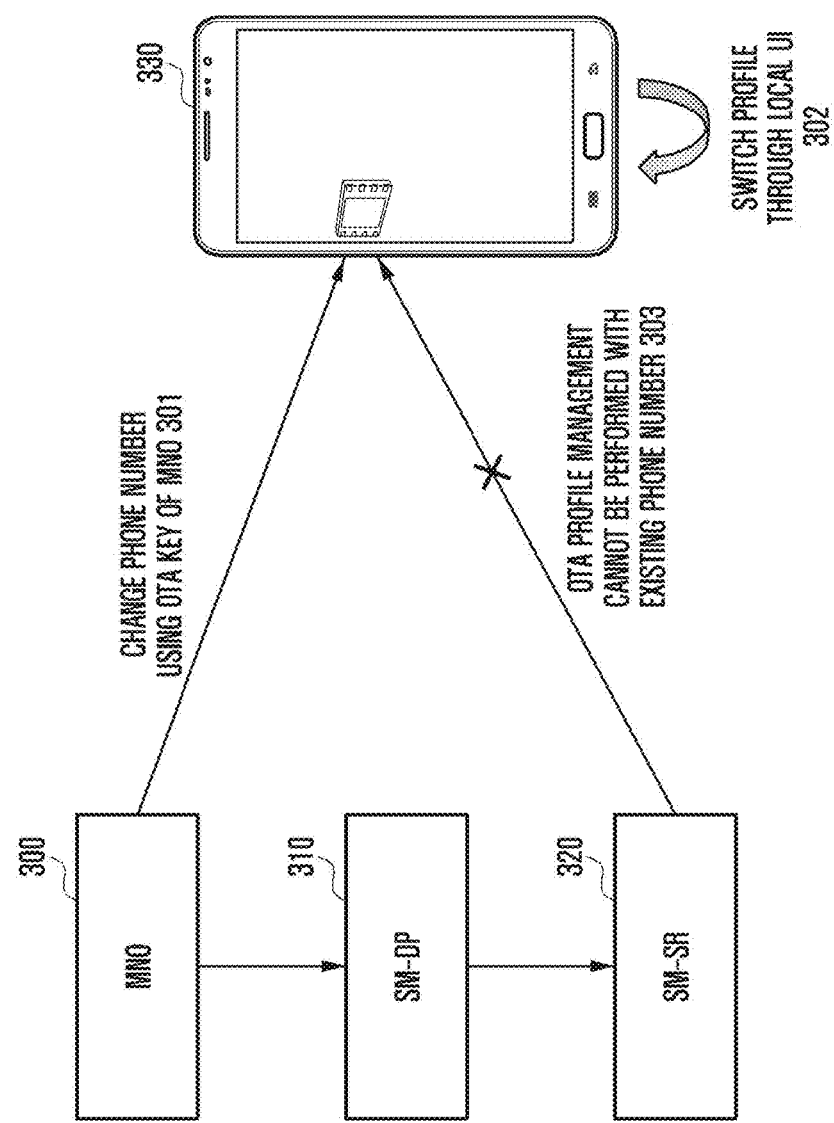
FIG. 3 is an example diagram for explaining problems of the related art to be solved according to this disclosure.

FIGS. 4 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system. Hereinafter, an embodiment of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

The specific terms used herein are provided for ease of understanding the present disclosure, and such specific terms is changed into other forms without departing from the spirit and scope of the present disclosure.

First, the terms used in this specification will be defined. A UICC in this specification is a smart card inserted into a mobile communication terminal and means a chip that stores personal information of a mobile communication subscriber, such as network access authentication information, a phone number list, and an SMS, and performs subscriber authentication and traffic security key generation when a connection is made to a mobile communication network, such as GSM, WCDMA, LTE, etc., thereby making it possible to stably use mobile communication. The UICC is embedded with a communication application, such as a subscriber identification module (SIM), a universal SIM (USIM), an IP multimedia SIM (ISIM), etc. according to the type of a mobile communication network to which a subscriber connects, and provides a higher level security function for loading various applications, such as an electronic wallet, ticketing, an electronic passport, etc.

An embedded UICC (eUICC) in this specification is a security module in the shape of a chip embedded in a terminal, but not a detachable module that can be inserted into and detached from a terminal. The eUICC is installed by downloading a profile using over the air (OTA) technology.

The term "UICC" in this specification may be used interchangeably with the term "SIM," and the term "eUICC" may be used interchangeably with the term "eSIM." A profile in this specification may mean a thing in which an application, a file system, an authentication key, etc. to be stored in a UICC are packaged in a software format. A USIM profile in this specification may have the same meaning as a profile, or may mean a thing in which information incorporated in a USIM application in a profile is packaged in a software format. An operational profile in this specification may mean a thing in which subscription information of a mobile network operator to which a terminal user has subscribed is packaged in a software format. A provisioning profile in this specification may mean a previously embedded profile in an eUICC, which a terminal requires in order to connect to an arbitrary mobile communication network in an arbitrary country before a user subscribes to a specific mobile communication operator.

A subscription manager data preparation (SM-DP) in this specification is represented as a profile providing server, an off-card entity of profile domain, a profile encryption server, a profile creation server, a profile provisioner, or a profile provider. A subscription manager secure routing (SM-SR) in this specification is represented as a profile management server, an off-card entity of eUICC profile manager, or a profile manager. An eUICC information set (EIS) in this specification is used as a term that collectively calls all eUICC related information (EID, ICCID, etc.) to be stored in an SM-SR. An issuer security domain root (ISD-R, eUICC profile manager) in this specification is represented as a profile manager, and is a control module that performs functions, such as profile download, enable, disable, delete, etc., by decoding an OTA message that an SM-SR server encrypts and transmits in an eUICC/eSIM.

An issuer security domain profile (ISD-P) in this specification is represented as a profile domain, and is installed by decoding a profile message that an SM-DP encrypts and transmits in an eUICC/eSIM. An MNO security domain (MNO-SD) in this specification is a security area stored in a profile when the profile is installed, and access and modification thereto can be made only with an MNO OTA key (or profile access credential) held by an MNO. A profile ID in this specification is referred to as an integrated circuit card ID (ICCID) or a factor matched with an ICCID and an ISD-P. A profile ID represents a unique identifier of each profile.

An eUICC ID in this specification is a unique identifier of an eUICC embedded in a terminal and is referred to as an EID. Furthermore, in cases where a provisioning profile is already loaded in an eUICC, an eUICC ID is a profile ID of the corresponding provisioning profile. Moreover, in cases where a terminal and an eUICC (or an eSIM) are not separated from each other as in embodiments of the present disclosure, an eUICC ID is a terminal ID. In addition, an eUICC also refers to a specific secure domain of an eSIM chip.

The term "terminal" used in this specification can be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a moving node, a mobile, or other terms. Various embodiments of a terminal includes a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof.

Furthermore, a terminal includes, but is not limited to a machine to machine (M2M) terminal and a machine type communication (MTC) terminal/device. Also, it will be apparent to those skilled in the art that a control unit or a controller used in this specification is used as the same meaning.

Figure 4:
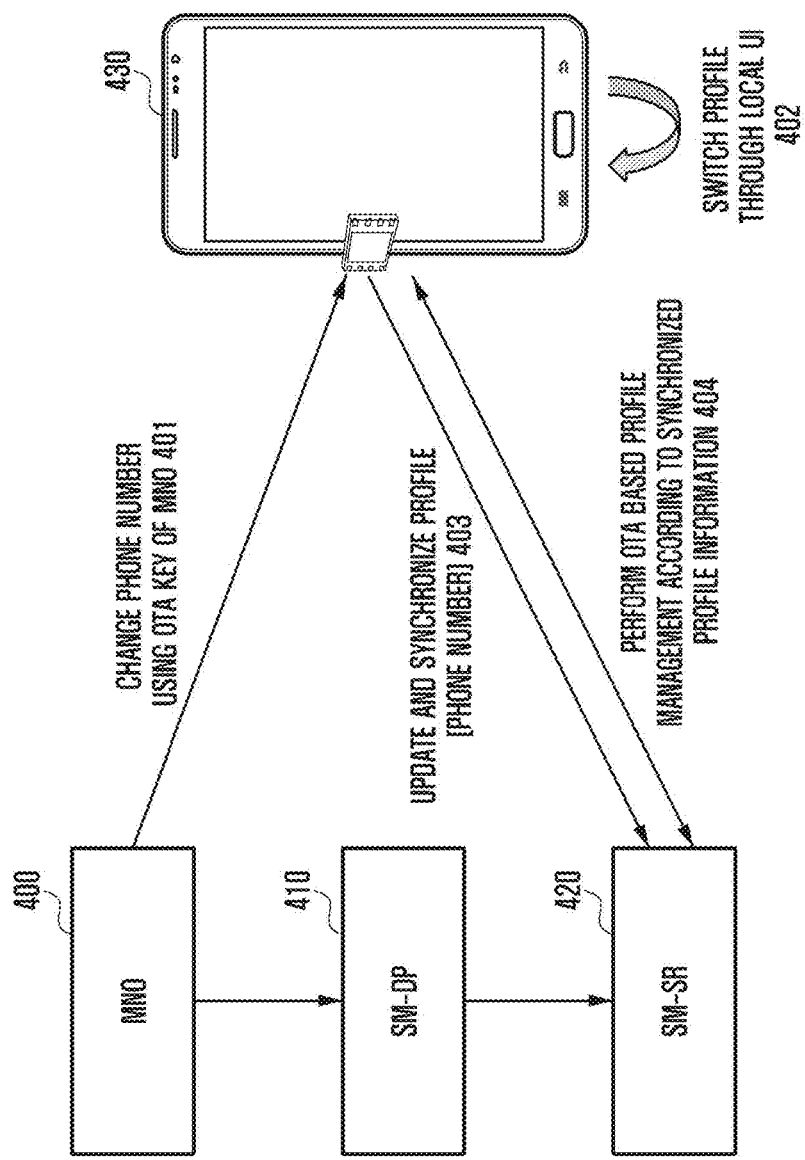
FIG. 4 is an example diagram schematically illustrating the concept of an updating method of a profile management server according to this disclosure.

FIG. 4 is an example diagram schematically illustrating the concept of an updating method of a profile management server according to this disclosure. In FIG. 4, it is assumed that a profile is already installed and operated in an eUICC of a terminal 430. An MNO 400 modifies information of an MNO-SD area in the eUICC of the terminal 430 using an OTA key of the MNO. For example, the phone number (MSISDN) of the terminal is changed in response to a request of a user or a selection of the MNO 400 (step 401). Or, the terminal 430 provides a UI to the user and allow the user to select a profile that he/she wants to subscribe to or use among a plurality of profiles stored in the eUICC of the terminal 430 (step 402). In this case, the profile switching process is a process of switching an existing profile to a disabled state and switching a new profile to an enabled state. At this time, the existing profile may also be deleted.

According to the present disclosure, in cases where the information on the area where only the MNO 400 in the eUICC of the terminal 430 can access is modified as described above, the eUICC updates the profile including the modified information to an SM-SR 420 to synchronize the profile information with the eUICC in the terminal 430 (step 403). When the modified information is updated to the SM-SR 420 in step 403, the MNO 400 performs OTA technology based profile management according to the synchronized profile information (step 404). Here, the profile management may mean all activities for making a modification to a profile, such as provisioning, enabling, disabling, or deleting the profile stored in the eUICC. In cases where the information such as the MSISDN of the terminal is modified according to step 401 or 402, the MNO 400 and the eUICC know about the modified information, but an SM-DP 410 or an SM-SR 420 that actually manages a profile fails to receive an update on the modified information so that the MNO 400 not perform profile management based on OTA technology afterward.

Figure 5:
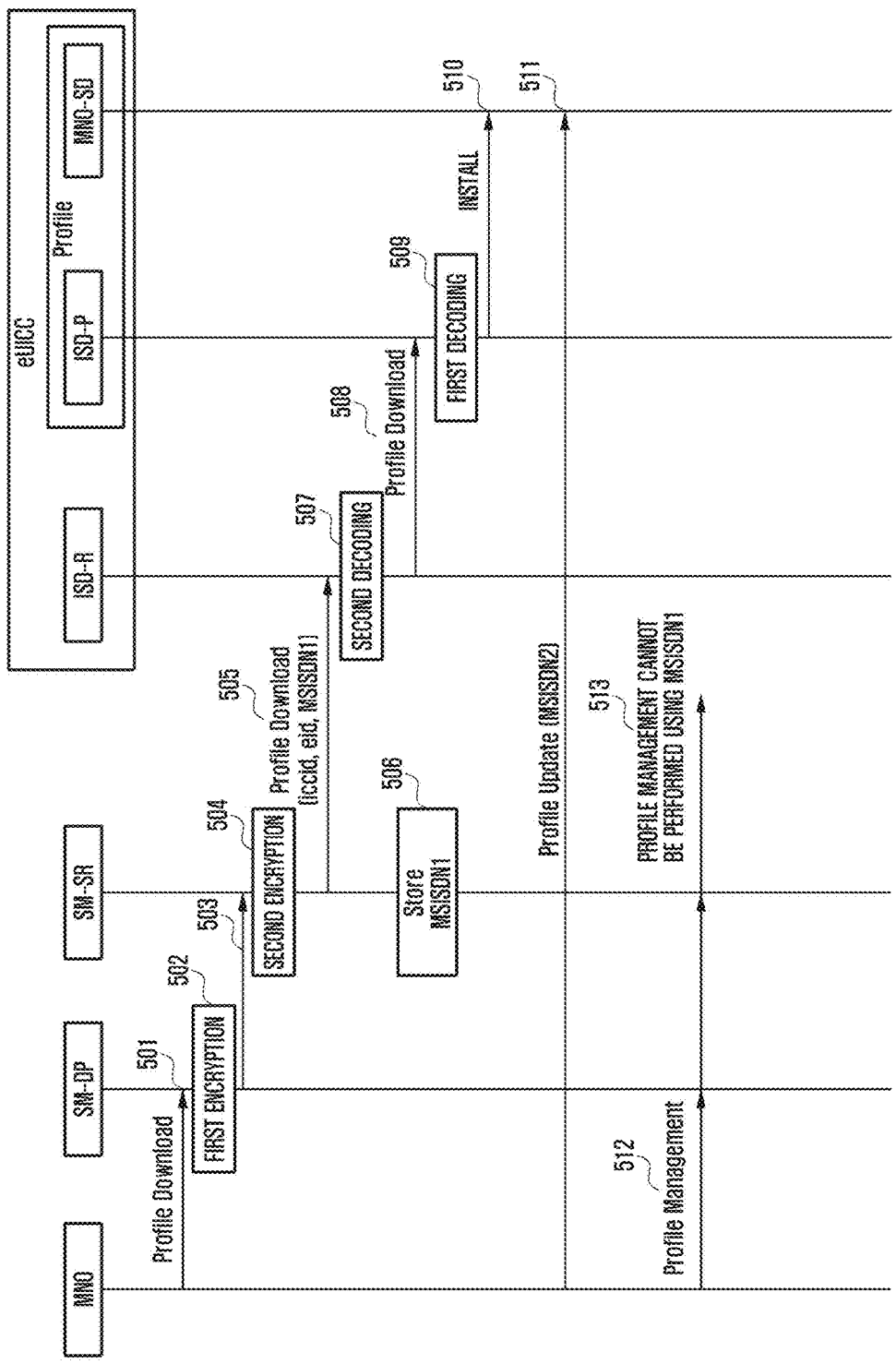
FIG. 5 is an example flow diagram illustrating an operation when existing profile information is switched according to this disclosure.

FIG. 5 is an example flow diagram illustrating an operation when existing profile information is switched according to this disclosure. In step 501, an MNO requests a profile download from a subscription manager data preparation (SM-DP). The corresponding download request is a profile prep request. The request which the MNO transfers to the SM-DP includes an EID of an eUICC of a user terminal, a profile ID, PLMNID, or the like, and an ICCID value used as the identifier of an existing UICC card is used as the profile ID. The SM-DP creates a profile to be provided to the eUICC on the basis of the information from the MNO and encrypt the profile using a session key in step 502, and then transfers the encrypted profile to an SM-SR in step 503. Hereinafter, encrypting the profile created by the SM-DP using the session key is referred to as first encryption for convenience.

In various embodiments, the eUICC shares a session key with the SM-DP using a digital authentication method. For example, the eUICC receives a digital certificate corresponding to the eUICC through an SM-SR from the SM-DP, create a session key using the received digital certificate, encrypt the session key, and then transmit the encrypted session key to the SM-DP. The SM-DP decodes the received session key using a digital certificate, encrypt a profile for the eUICC corresponding to the relevant digital certificate using the corresponding session key, and transmit the encrypted profile to the terminal. In the case of using a digital authentication method, the SM-DP encrypts a profile using a public key that is created using a digital certificate, and the eUICC decodes the profile using a private key that is created using a digital certificate. In the above description, the method of using the digital certificate through the session key sharing method has been exemplified. However, the present disclosure is not limited thereto, and a scheme is used in which the SM-DP and the terminal share various authentication algorithms. In step 504, the SM-SR transfers, to the eUICC, information on the first encrypted profile and/or the session key from the SM-DP, or transfer, to the SM-DP, the first encrypted session key from the eUICC. At this time, the SM-SR encrypts data to be transmitted to the eUICC using an OTA key and transmit the encrypted data to the eUICC. For convenience, this is referred to as second encryption in this specification. The SM-SR provides the second encrypted data to the eUICC in step 505. A specific method provided is implemented according to various embodiments. In step 505, the SM-SR transmits an SMS to the terminal including the eUICC, thereby triggering a profile download (Profile D/L Trigger). The encrypted data can be stored at step 506. The MSISDN (phone number) of a provisioning profile included in the eUICC is used in the transmission of the SMS. Specifically, the SM-SR transmits the SMS to the terminal having the eUICC embedded therein using a short message service center (SMSC) of a mobile network. The SMS transmitted through the mobile network is the triggering of the profile download (Profile D/L Trigger). According to the 3GPP standard, the protocol identifier of the SMS header is set to "SIM data download" and a data coding scheme to "Class 2 message", and a communication unit, namely, a modem device of the terminal having received the corresponding SMS does not transmit the SMS information to the user equipment, but directly transmits the SMS information to the eUICC. Data fields in the SMS are authenticated and encrypted using a secure channel protocol, called SCP80, which is used in OTA technology, and the key version number (KVN) of an authentication and encryption key that is used in this case is one of a total of 15 numbers, KVN 0x01 to 0x0F defined according to the ETSI TS 102.225 standard. The eUICC, after receiving the SMS, transmits a profile D/L request to the SM-SR through the modem (communication unit) of the terminal. The SM-SR having received the profile D/L request forwards the profile D/L request to the SM-DP. In FIG. 5, it is illustrated that the SM-SR receives the profile which has been created by the SM-DP in step 503. However, in another method, the SM-SR also requests a profile download for the eUICC from the SM-DP to receive a profile.

According to the above described various embodiments, the eUICC creates a secure channel together with the SM-SR to download the profile created by the SM-DP at step 505.

Here, the configuration of the eUICC will be described in brief. The eUICC includes one issuer security domain root (ISD-R), one eUICC controlling authority security domain (ECASD), and at least one issuer security domain profile (ISD-P). The ISD-P and the MNO-SD are illustrated as equivalent components in the drawing; however, in the strict sense, the MNO-SD may mean an area including OTA key sets of the MNO in the area of the ISD-P. Operations of the respective components will be described below in brief.

The issuer security domain root (ISD-R, eUICC profile manager) is represented as a profile manager, and is a control module that performs functions, such as profile download, enable, disable, delete, etc., by decoding an OTA message that an SM-SR server encrypts and transmits in the eUICC/eSIM. The issuer security domain profile (ISD-P) is represented as a profile domain, and is installed by decoding a profile message that an SM-DP encrypts and transmits in the eUICC/eSIM. The MNO security domain (MNO-SD) is a security area stored in a profile when the profile is installed, and access and modification thereto can be made only with an MNO OTA key (or profile access credential) held by the MNO.

In step 507, the ISD-R decodes the received encrypted profile using a key shared with the SM-DP (second encryption). Thereafter, the ISD-P in the eUICC decodes the downloaded profile (first decoding) at step 508, performs the first decoding at step 509, and installs the profile in the MNO-SD area at step 510. Meanwhile, the MNO-SD is owned as a security domain portion of the profile by the MNO and provides a secured channel with an OTA platform of the MNO. The MNO-SD is used to manage content of the profile when the profile is enabled.

In step 511, the MNO modifies elementary files (EFs) in the MNO-SD area of the eUICC using the OTA key thereof. The EFs is files that store various types of information, such as an MSISDN, an IMSI, etc. in the profile stored in the eUICC. In FIG. 5, it is assumed that the MSISDN of the eUICC is changed from MSISDN 1 to MSISDN 2 due to an update based on the OTA of the MNO at step 511. Then, the MNO attempts to transmit arbitrary data through the SM-DP and the SM-SR in order to perform profile management at step 512. Here, the profile management refers to a series of activities for making a modification to the state of the profile, such as provisioning, enabling, disabling, and/or deleting the profile. Since the SM-SR does not know about the changed MSISDN 2, the SM-SR cannot perform data communication with the eUICC for profile management at step 513.

Figure 6:
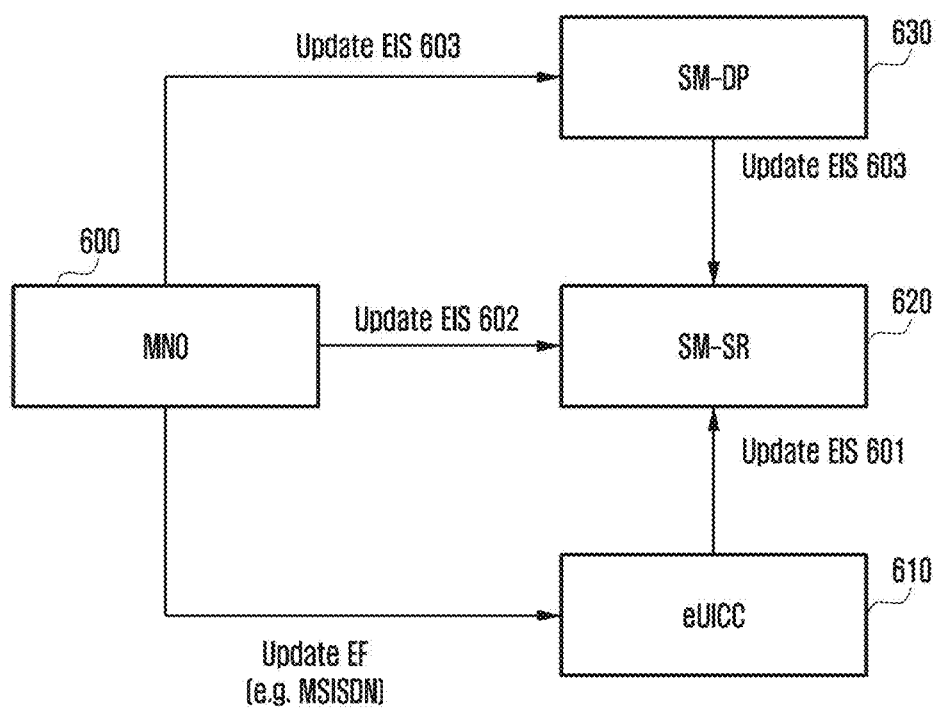
FIG. 6 is a schematic diagram illustrating three methods for an updating route of a profile management server according to this disclosure.

FIG. 6 is an example schematic diagram illustrating three methods for an updating route of a profile management server according to disclosure. Referring to FIG. 6, in cases where a profile is modified using an OTA key of an MNO 600, that is, in cases where information of an MNO-SD area in an eUICC 610 is modified, an embodiment of the present disclosure for updating the modification to an EIS of an SM-SR 620 is performed following three routes, 601, 602, and 603.

Specifically, the EIS is updated using at least one of three methods following three different routes, respectively. One is a method in which the eUICC 610 directly updates the EIS of the SM-SR 620 via route 601, another is a method in which the MNO 600 directly updates the EIS of the SM-SR 620 via route 602, and the third is a method in which the MNO 600 requests an SM-DP 630 to update the EIS of the SM-SR 620 via route 603, that is, a method in which the SM-DP 630 updates the EIS of the SM-SR 620. The updating methods will be described in detail with reference to FIGS. 7 to 10.

Figure 7:
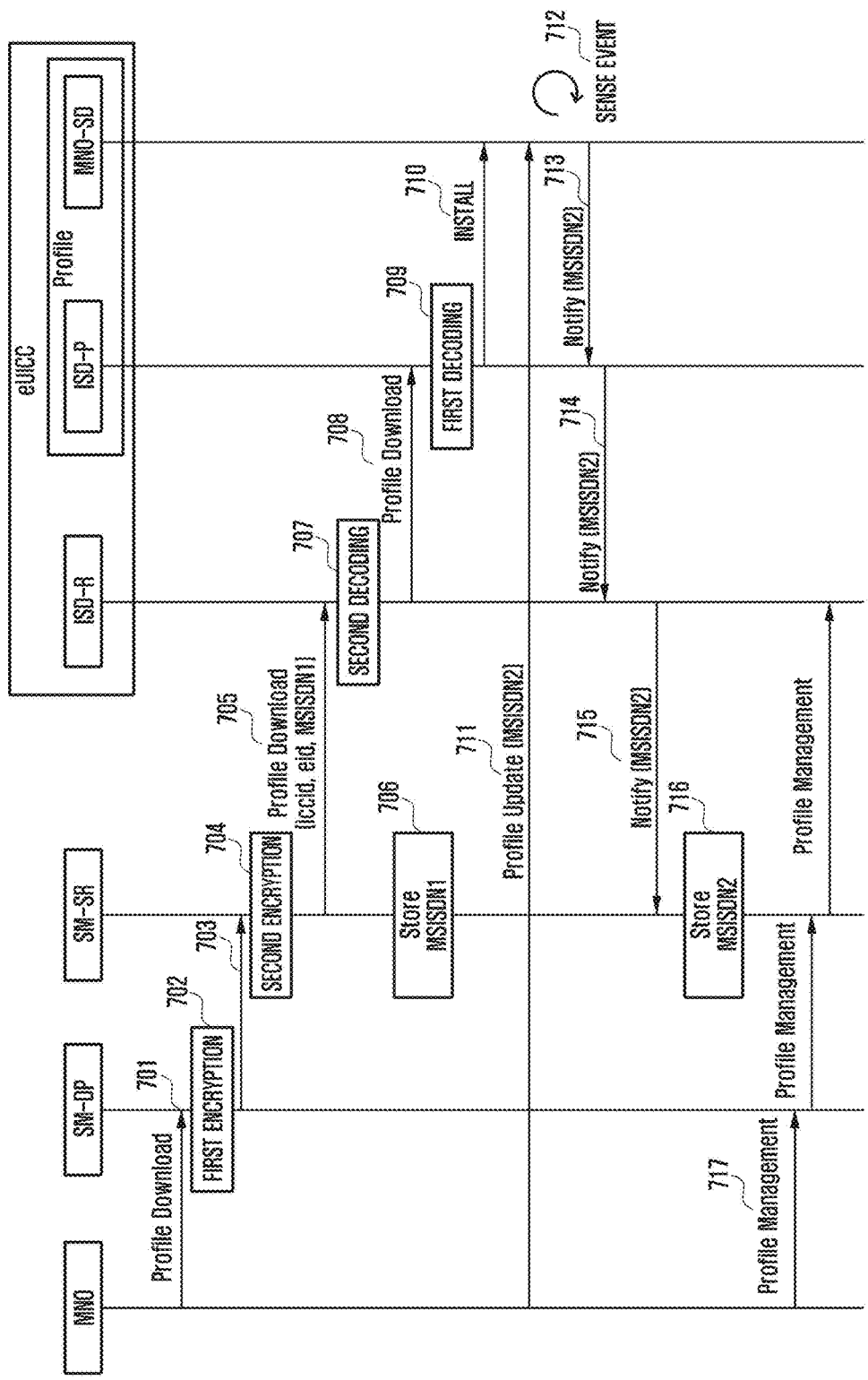
FIG. 7 is an example flow diagram illustrating an updating method of a profile management server according to this disclosure.

FIG. 7 is an example flow diagram illustrating an updating method of a profile management server according to a first embodiment of this disclosure. The steps 701, 702, 703, 704, 705, 706, 707, 708, 709, 710, and 711 in FIG. 7 are the same as steps 501, 502, 503, 504, 505, 506, 507, 508, 509, 510, and 511 in FIG. 5, respectively, detailed descriptions thereof will be omitted herein and are substituted by the descriptions of FIG. 5.

The first embodiment of the present disclosure, illustrated in FIG. 7, is a method of transmitting modified data in order that the eUICC directly updates the EIS of the SM-SR. In step 712, the eUICC senses the occurrence of an event while monitoring the change of data in the MNO-SD area. The sensed event may mean the change of data, such as the creation, modification, or deletion of data. In addition, the change of data is determined according to various embodiments, such as a method of sensing it by the MNO-SD, a method of sensing it by the ISD-P, a method of sensing it by the ISD-R, or a method of monitoring it by the controller of the terminal.

When an event is sensed, the MNO-SD informs the ISD-P of the modified information in step 713, and the modified information is transferred and updated to the ISD-R at step 714 and the SM-SR at step 715. Here, the modified information may mean one or more of modified data itself among the EFs of the MNO-SD, a partial area of a profile including modified data, and a profile itself including modified data. Further, information to be included in the modified information also sets by the eUICC. For example, only when information configured using different settings according to terminals having an eUICC mounted thereto is modified, the modified information is sensed and synchronized to the SM-SR.

The SM-SR, when receiving the modified information, stores it therein at step 716 to update the EIS. The eUICC information set (EIS) may mean a set of information related to an individual eUICC which is stored in the SM-SR, and is a structure for storing information, such as an MSISDN, a profile ID, etc., for each eUICC, or a specific record of a table in a database.

The transfer of the modified information to the SM-SR by the eUICC is performed through a secured channel between the SM-SR and the eUICC according to the ES5 interface of the GSMA standard, in which case the eUICC authenticates and encrypts the modified information using a secure channel protocol, called SCP80, to transmit the encrypted information. Further, a previously defined control message is used, or a newly defined instruction or control message is also used for the transmission of information. Thereafter, in a profile management process at step 717, the MNO performs management of the profile, such as installation, state change, or deletion thereof, through the SM-DP and the SM-SR.

Figure 8:
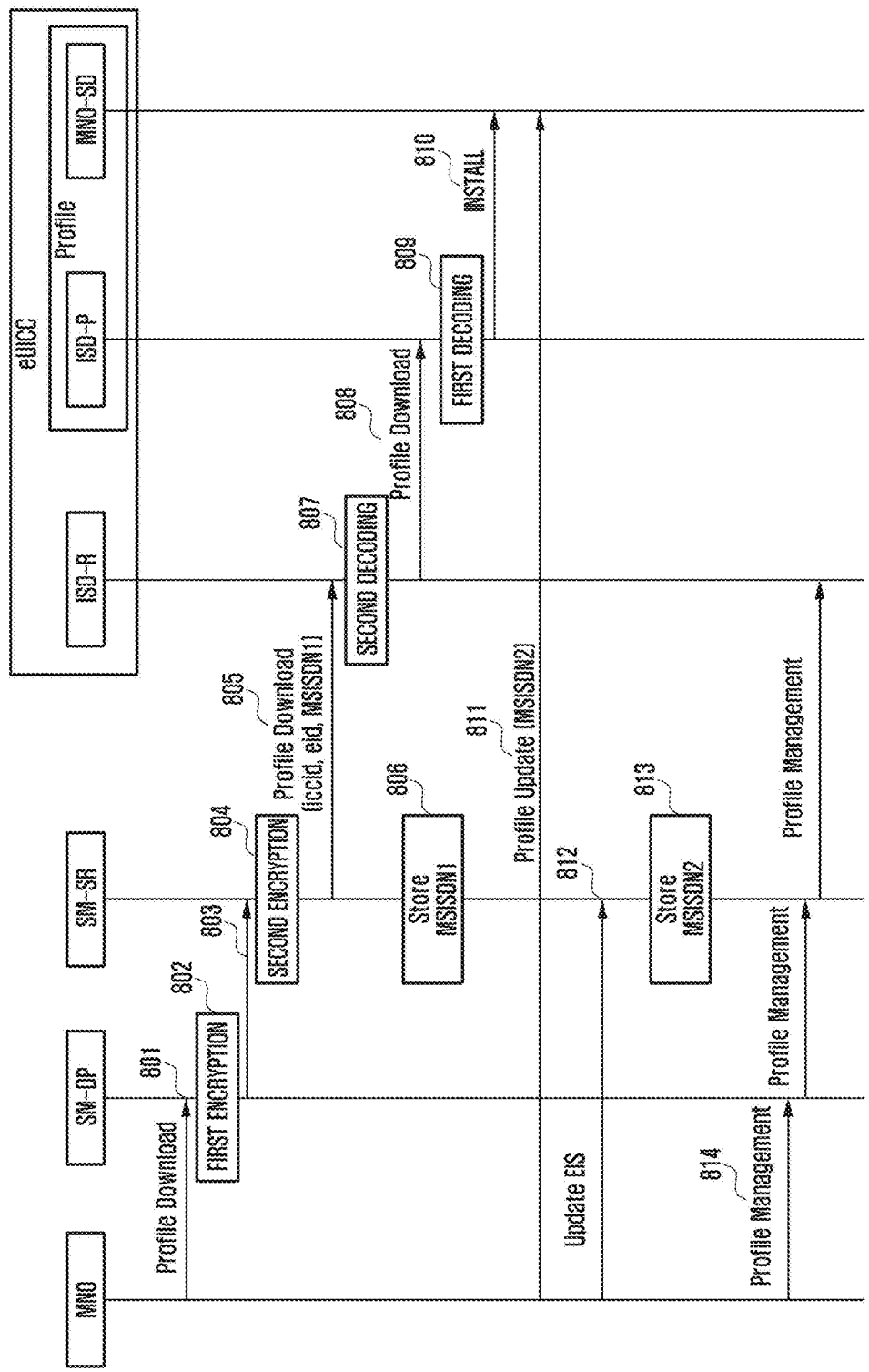
FIG. 8 is an example flow diagram illustrating an updating method of a profile management server according to this disclosure.

FIG. 8 is an example flow diagram illustrating an updating method of a profile management server according to a second embodiment of this disclosure. The steps 801, 802, 803, 804, 805, 806, 807, 808, 809, 810, and 811 in FIG. 8 are the same as steps 501, 502, 503, 504, 505, 506, 507, 508, 509, 510, and 511 in FIG. 5, respectively, detailed descriptions thereof will be omitted herein and are substituted by the descriptions of FIG. 5.

The second embodiment of the present disclosure, illustrated in FIG. 8, is a method of transmitting data such that the MNO directly updates the EIS to the SM-SR, but not a method of transmitting modified data such that the eUICC directly updates the EIS of the SM-SR.

When the MNO modifies data of the MNO-SD in the eUICC using an MNO OTA key in step 811, the MNO updates the EIS by providing the modified information to the SM-SR immediately or after the data is completely modified at step 812. Here, the modified information may mean one or more of modified data itself among the EFs of the MNO-SD, a partial area of a profile including modified data, and a profile itself including modified data. The SM-SR, when receiving the modified information, stores it therein at step 813 to update the EIS.

Here, the transfer of the modified information to the SM-SR by the MNO is performed by the ES4 interface of the GSMA standard between the MNO and the SM-SR. Further, a previously defined control message is used, or a newly defined instruction or control message is also used for the transmission of information. Thereafter, in a profile management process at step 814, the MNO performs management of the profile, such as installation, state change, or deletion thereof, through the SM-DP and the SM-SR.

Figure 9:
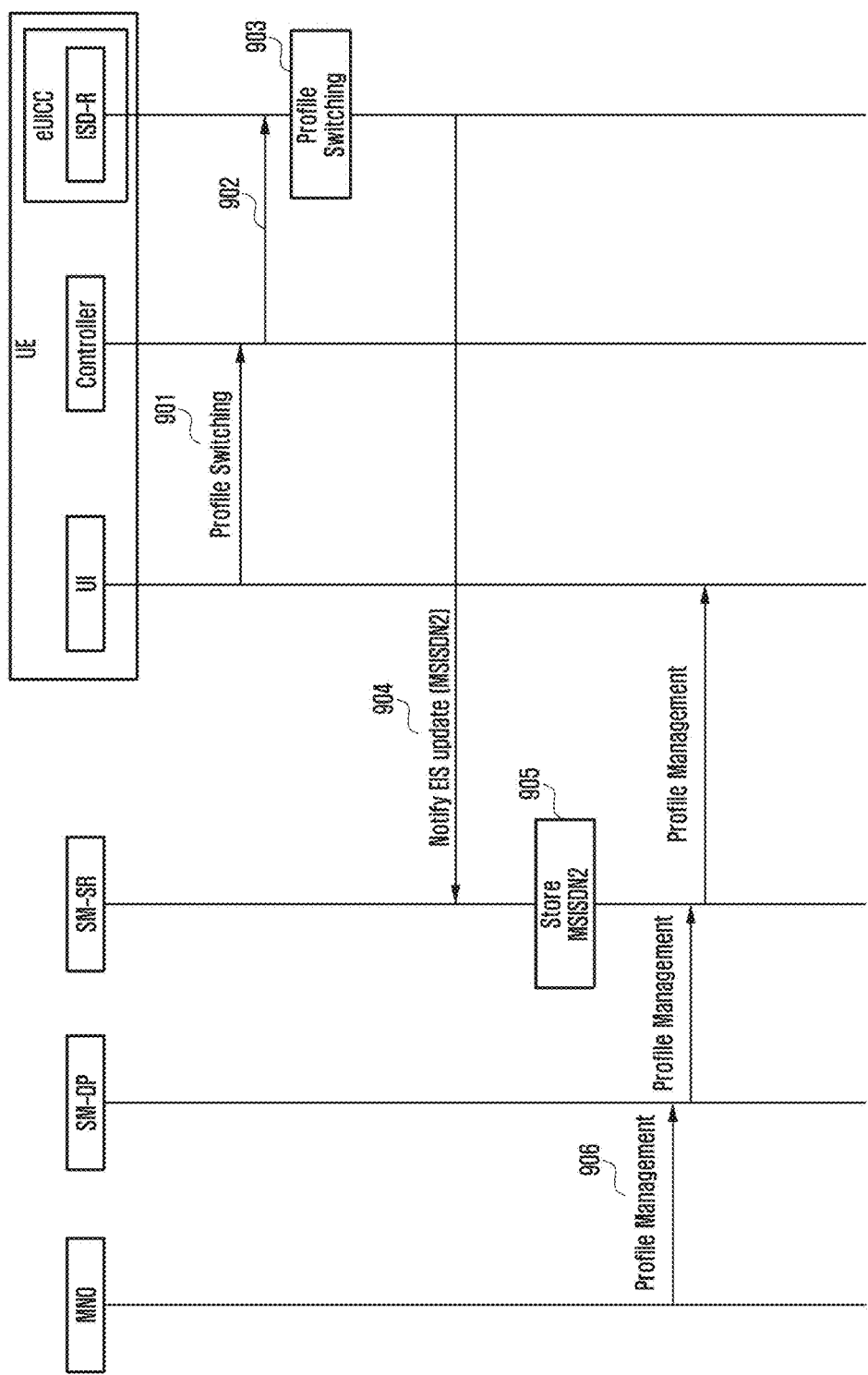
FIG. 9 is an example flow diagram illustrating an updating method of a profile management server according to this disclosure.

FIG. 9 is a flow diagram illustrating an updating method of a profile management server according to a third embodiment of the present disclosure. In the third embodiment of the present disclosure, data is directly modified in the terminal unlike in FIGS. 7, 8, and 10, in which case the MNO, the SM-DP, and the SM-SR, except for the eUICC, cannot know about the modification of data until there is an update on the modification of data. That is, in the third embodiment, only the eUICC can make a request for updating the EIS to the SM-SR, and the MNO cannot transmit a request for updating the EIS to the SM-SR or the SM-DP.

Referring to FIG. 9, at step 901, the terminal allows a user to select, through a UI, a profile of a mobile network operator that the user wants to use among one or more profiles stored in the eUICC of the terminal. Specifically, when changing a subscribed mobile communication network, the user directly selects a profile to which he/she wants to connect, through the UI of the terminal. In cases where a preset profile is switched, the existing profile is switched to a disabled state, and a new profile is switched to an enabled state. At this time, the existing profile is also deleted.

The controller of the terminal having received the user's profile switching request make a request for switching the profile to the ISD-R in the eUICC at step 902, and after the ISD-R switches the profile at step 903, the eUICC transmits a message to make a request for updating the EIS to the SM-SR at step 904. Here, the EIS update request message includes a profile ID of the switched profile. The SM-SR, when receiving the modified information, stores it therein at step 905 to update the EIS. The transfer of the modified information to the SM-SR by the eUICC is performed through a secured channel between the SM-SR and the eUICC according to the ES5 interface of the GSMA standard, in which case the eUICC authenticates and encrypts the modified information using a secure channel protocol, called SCP80, to transmit the encrypted information. Further, a previously defined control message is used, or a newly defined instruction or control message is also used for the transmission of information. Thereafter, in a profile management process at step 906, the MNO performs management of the profile, such as installation, state change, or deletion thereof, through the SM-DP and the SM-SR.

Figure 10:
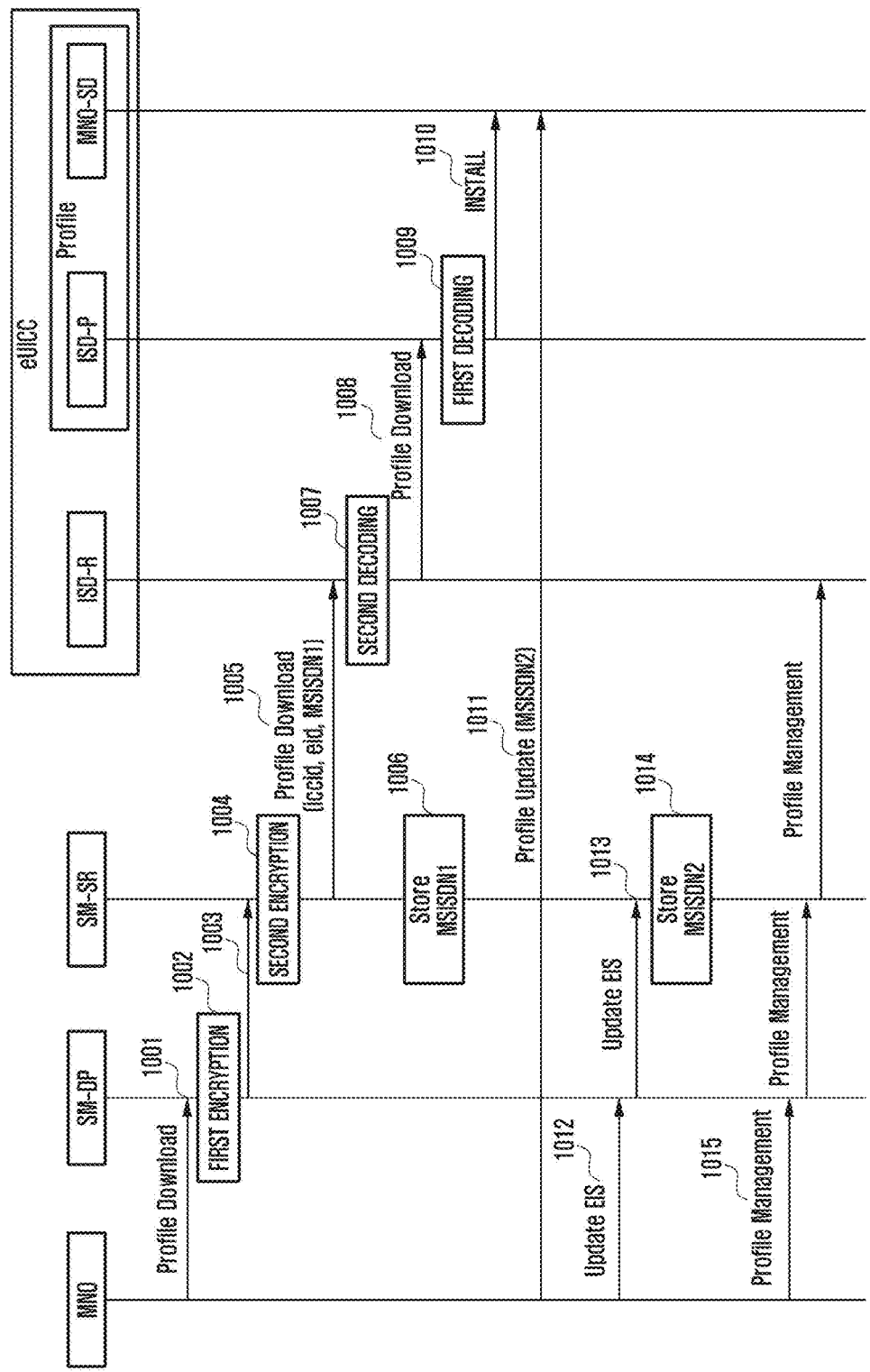
FIG. 10 is an example flow diagram illustrating an updating method of a profile management server according to a fourth embodiment of this disclosure.

FIG. 10 is an example flow diagram illustrating an updating method of a profile management server according to a fourth embodiment of this disclosure. The steps 1001, 1002, 1003, 1004, 1005, 1006, 1007, 1008, 1009, 1010, and 1011 in FIG. 10 are the same as steps 501, 502, 503, 504, 505, 506, 507, 508, 509, 510, 511 in FIG. 5, respectively, detailed descriptions thereof will be omitted herein and are substituted by the descriptions of FIG. 5.

The fourth embodiment of the present disclosure, illustrated in FIG. 10, is a method of transmitting, by the MNO, data or a request message for instructing the SM-SR to update the EIS to the SM-DP such that the SM-DP updates the EIS to the SM-SR, but not a method of transmitting data such that the MNO directly updates the EIS to the SM-SR.

When the MNO modifies data of the MNO-SD in the eUICC using an MNO OTA key in step 1011, the MNO updates the EIS by providing the modified information to the SM-DP immediately or after the data is completely modified at step 1012.

In various embodiments, the method of providing the modified information to the SM-DP is a method of directly providing the modified information itself to the SM-DP, or a method of transmitting a message for instructing the SM-DP to transmit, to the SM-SR, a message informing that the SM-SR has to check the change of the EIS with the eUICC. Here, the modified information may mean one or more of modified data itself among the EFs of the MNO-SD, a partial area of a profile including modified data, and a profile itself including modified data. The SM-DP, when receiving the modified information, forwards it to the SM-SR at step 1013, or requests the SM-SR to identify whether modified information exists in the eUICC. The SM-SR updates the EIS according to the information received from the SM-DP at step 1014, or also updates the EIS by transmitting a message for instructing to update the EIS to the eUICC (not illustrated).

Here, data is transmitted and received between the MNO and the SM-DP by the ES2 interface determined in the GSMA standard and between the SM-DP and the SM-SR by the ES3 interface. Further, a previously defined control message or a newly defined instruction or control message is used for data transmission. Thereafter, in a profile management process at step 1015, the MNO performs management of the profile, such as installation, state change, or deletion thereof, through the SM-DP and the SM-SR.

Figure 11:
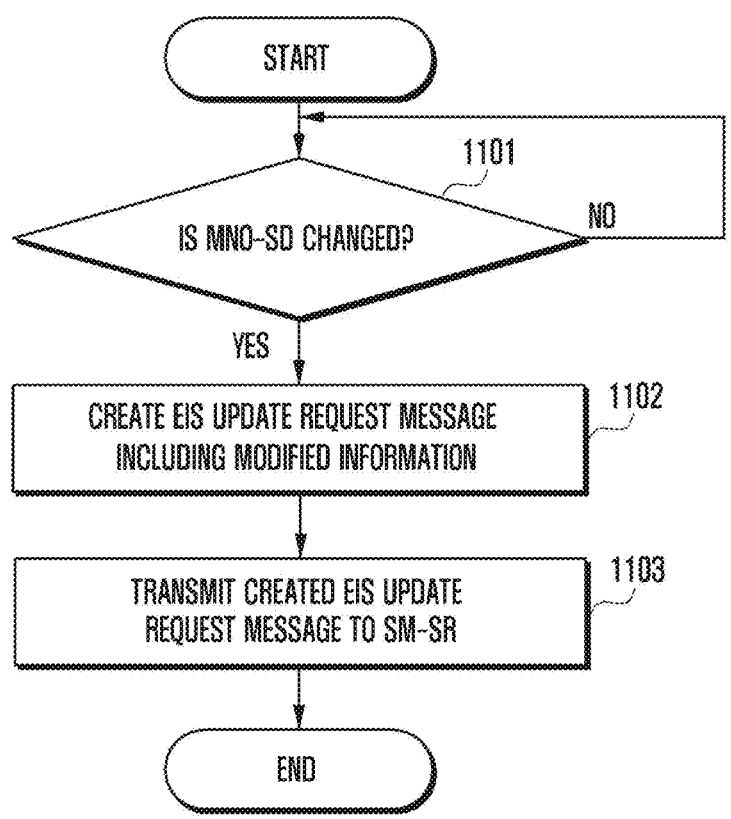
FIG. 11 is an example flowchart illustrating an operation of a terminal/eUICC according to this disclosure.

FIG. 11 is an example flowchart illustrating an operation of a terminal/eUICC according to this disclosure. Referring to FIG. 11, the terminal/eUICC senses the occurrence of an event while monitoring the change of data in an MNO-SD area in step 1101. Here, the sensed event may mean the change of data, such as the creation, modification, or deletion thereof. In addition, the change of data is determined according to various embodiments, such as a method of sensing it by an ISD-P, a method of sensing it by the ISD-R, or a method of monitoring it by a controller of the terminal.

When an event is sensed, the terminal/eUICC informs the ISD-P of the modified information, and the modified information is transferred to the ISD-R and an SM-SR such that an EIS is updated. Specifically, in step 1102, the terminal/eUICC creates an EIS update request message including the modified information. Here, the modified information may mean one or more of modified data itself among EFs of the MNO-SD, a partial area of a profile including modified data, and a profile itself including modified data.

At step 1102, the terminal/eUICC creates the EIS update request message including the modified information. In step 1103, the terminal/eUICC transmits the created EIS update request message to the SM-SR. In this case, the EIS update request message is transmitted through a secured channel between the SM-SR and the eUICC by the ES5 interface of the GSMA standard in which the EIS update request message is authenticated and encrypted using a secure channel protocol which is called SCP80.

The SM-SR updates the EIS in the SM-SR on the basis of the modified information included in the received EIS update request message to make profile management by OTA possible.

Figure 12:
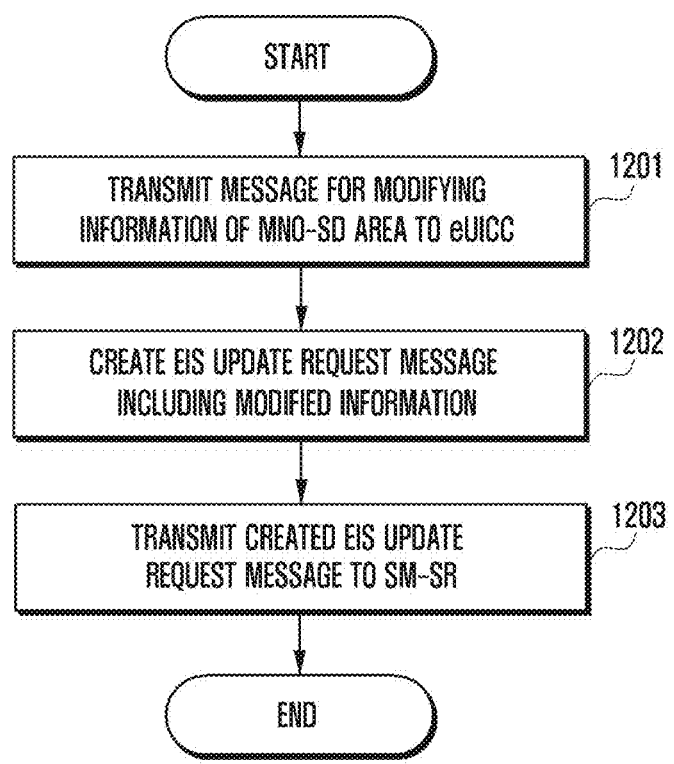
FIG. 12 is an example flowchart illustrating an operation of an MNO according to this disclosure.

FIG. 12 is an example flowchart illustrating an operation of an MNO according to this disclosure. Referring to FIG. 12, the MNO modifies information stored in an MNO-SD of an eUICC using an MNO OTA key at step 1201. In this case, a method in which the MNO modifies the information stored in the MNO-SD is not limited in the present disclosure. The information stored in the MNO-SD which the MNO modifies is an elementary file (EF). The EF is a file that stores various types of information, such as an MSISDN, an IMSI, etc. in a profile stored in the eUICC.

At step 1202, the MNO creates an EIS update request message including the modified information. Here, the modified information may mean one or more of modified data itself in the EF of the MNO-SD, a partial area of a profile including modified data, modified data and an EID, modified data and a profile ID, and a profile itself including modified data.

At step 1203, the MNO transmits the created EIS update request message to an SM-SR. The transfer of the modified information to the SM-SR by the MNO is performed by the ES4 interface of the GSMA standard between the MNO and the SM-SR. Further, a previously defined control message is used, or a newly defined instruction or control message also be used for the transmission of information.

The SM-SR updates an EIS in the SM-SR on the basis of the modified information included in the received EIS update request message to make profile management by OTA possible.

In various embodiments, the MNO also transmits the EIS update request message to an SM-DP, but not the SM-SR. In this case, the SM-DP forwards the received EIS update request message to the SM-SR as it is, according to the fourth embodiment of the present disclosure. Or, the SM-DP also requests the SM-SR to identify whether modified information exists in the eUICC (not illustrated). The SM-SR updates the EIS according to the information received from the SM-DP, or also updates the EIS by transmitting a message for instructing to update the EIS to the eUICC. Here, data is transmitted and received between the SM-DP and the SM-SR by the ES3 interface. Further, a previously defined control message or a newly defined instruction or control message is used for data transmission.

Figure 13:
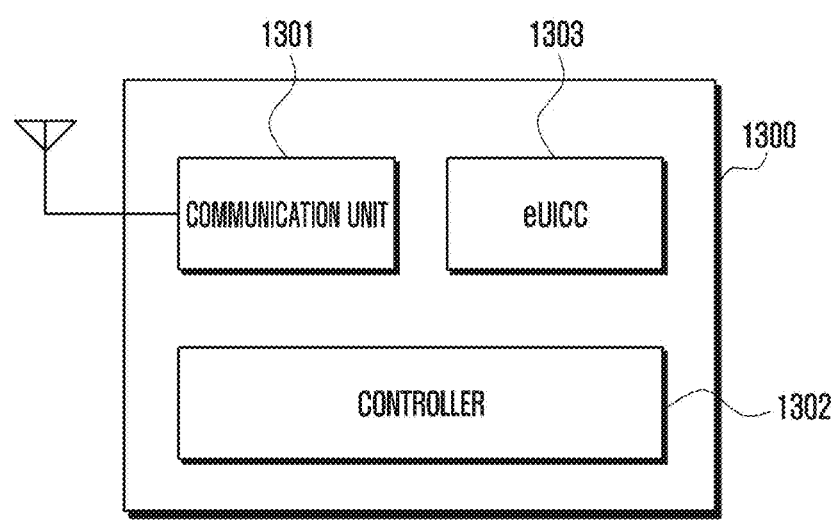
FIG. 13 is an example block diagram illustrating a configuration of a terminal according to this disclosure.

FIG. 13 is an example block diagram illustrating a configuration of a terminal according to this disclosure. Referring to FIG. 13, a terminal 1300 to which the present disclosure is applied include a communication unit 1301, a controller 1302, and an eUICC 1303. The communication unit 1301 performs data communication and also functions to transmit a message created by the eUICC to a device external to the terminal. The eUICC 1303 is a security module in the shape of a chip embedded in the terminal 1300, but not a detachable module that can be inserted into and detached from the terminal 1300. The eUICC 1303 is installed by downloading a profile using Over The Air (OTA) technology. Hereinafter, operations of the elements, according to the embodiment of the present disclosure, will be described in detail.

The controller 1302 determines the modification of information stored in a secured area of a profile stored in the eUICC. When the determination result shows that the information stored in the secured area has been modified, the controller 1302 creates an update request message of a profile management server which includes the modified information and transmits the created update request message to the profile management server. In this case, the information stored in the secured area is modified using a unique encryption key (OTA key) of a mobile network operator (MNO) of the profile. Further, the update request message created by the controller 1302 includes one of the modified information itself, a partial area of the profile including the modified information, and the profile including the modified information.

Figure 14:
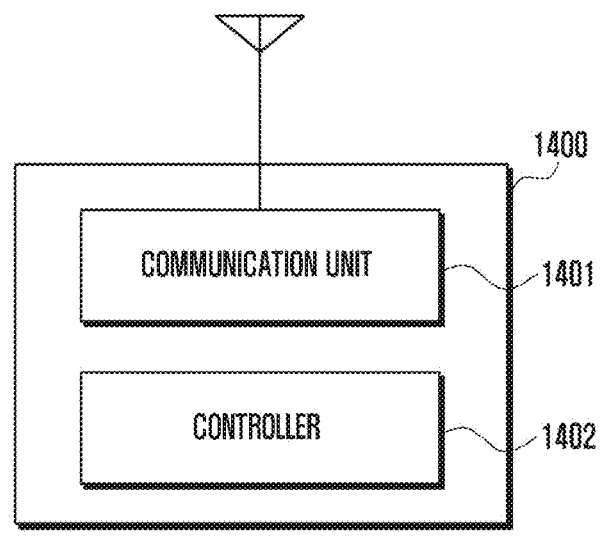
FIG. 14 is an example block diagram illustrating a configuration of an SM-SR or an SM-DP according to this disclosure.

FIG. 14 is an example block diagram illustrating a configuration of an SM-SR or an SM-DP according to this disclosure. The SM-DP and the SM-SR of the present disclosure functions as a server 1400 including a communication unit 1401 and a controller 1402. The SM-DP and the SM-SR can include a separate storage unit that can store information relating to a profile. Meanwhile, the storage unit is included in the controller and includes various types of modules for performing a variety of functions. The modules can be operated by one integrated controller and can also be operated as individual modules.

The communication unit 1401 performs data communication. The controller 1402 controls the overall operation of the server and processes various types of data information transmitted and received through the communication unit 1401. Hereinafter, operations of the elements, according to the embodiment of the present disclosure, will be described in detail. In the case of the SM-SR, the controller 1402 receives an update request message for profile related information, extracts the profile related information included in the received update request message, and renews pre-stored profile related information on the basis of the extracted profile related information. Here, the profile related information is stored in a secured area of the profile, and the secured area is changed using a unique encryption key (OTA key) of a mobile network operator (MNO).

In the case of the SM-DP, the controller 1402 receives an update request message for profile related information of a profile management server from a mobile network operator (MNO) and forwards the received update request message to the profile management server. Here, the update request message includes modified profile related information, and the profile related information is modified using a unique encryption key (OTA key) of the MNO.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a terminal, the method comprising:
installing a profile in a universal integrated circuit card (UICC) of the terminal;
determining, at the terminal, whether first information stored in a secured area of the profile installed in the UICC of the terminal is modified to second information;
creating a request message including the second information for updating profile related information stored in a profile management server if the first information stored in the secured area is modified to the second information; and
transmitting the created request message to the profile management server,
wherein the first information stored in the secured area is configured to be modified using a unique encryption key of a mobile network operator (MNO) of the profile, and
wherein the second information is not provided from the MNO to the profile management server before the created request message is transmitted from the terminal to the profile management server.

2. The method of claim 1, wherein the first information includes a first mobile subscriber issuer security domain number (MSISDN) and the second information includes a second MSISDN.

3. The method of claim 1, wherein the request message includes at least one of the second information, a partial area of the profile including the second information, and the profile including the second information.

4. A terminal comprising:
a transceiver configured to transmit and receive a signal; and
a controller configured to:
install a profile in a universal integrated circuit card (UICC) of the terminal;
determine, at the terminal, whether first information stored in a secured area of the profile installed in the UICC of the terminal is modified to second information,
create a request message including the second information for updating profile related information stored in a profile management server if the first information stored in the secured area is modified, and
transmit the created request message to the profile management server,
wherein the first information stored in the secured area is configured to be modified using a unique encryption key of a mobile network operator (MNO) of the profile,
wherein the second information is not provided from the MNO to the profile management server before the created request message is transmitted from the terminal to the profile management server.

5. The terminal of claim 4, wherein the first information includes a first mobile subscriber issuer security domain number (MSISDN) and the second information includes a second MSISDN.

6. The terminal of claim 4, wherein the request message includes at least one of the second information, a partial area of the profile including the second information, and the profile including the second information.

7. A method by a server for managing a profile, the method comprising:
receiving an update request message including second information for updating profile related information stored in the server;
extracting the second information included in the received update request message; and renewing pre-stored first information based on the extracted second information, wherein the profile is installed in a universal integrated circuit card (UICC) of a terminal, wherein the update request message is created if the first information stored in a secured area of the profile installed in the UICC is modified to the second information, wherein the first information in the secured area is modified using a unique encryption key of a mobile network operator (MNO), and wherein the second information is not provided from the MNO to the profile management server before receiving the update request message.

8. The method of claim 7, wherein the update request message is received from one of the MNO, a server creating the profile according to a request of the MNO, or the UICC.

9. The method of claim 7, wherein the first information includes a first mobile subscriber issuer security domain number (MSISDN) and the second information includes a second MSISDN.

10. The method of claim 7, wherein the update request message comprises at least one of the second information, a partial area of a profile including the second information, and the profile including the second information.

11. A server for managing a profile, the server comprising:
a transceiver configured to transmit and receive a signal; and
a controller configured to:
  receive an update request message including second information for updating profile related information stored in the server,
  extract the second information included in the received update request message, and
  renew pre-stored first information based on the extracted second information,
  wherein the profile is installed in a universal integrated circuit card (UICC) of a terminal,
  wherein the update request message is created if the first information stored in a secure area of the profile installed in the UICC is modified to the second information,
  wherein the first information in the secured area is modified using a unique encryption key of a mobile network operator (MNO), and
  wherein the second information is not provided from the MNO to the profile management server before receiving the update request message.

12. The server of claim 11, wherein the update request message is received from one of the MNO, a server creating the profile according to a request of the MNO, or the UICC.

13. The server of claim 11, wherein the first information includes a first mobile subscriber issuer security domain number (MSISDN) and the second information includes a second MSISDN.

14. The server of claim 11, wherein the update request message comprises at least one of the second information, a partial area of a profile including the second information, and the profile including the second information.

15. A method by a profile creation server of creating a profile, the method comprising:

receiving an update request message including second information for updating profile related information stored in a profile management server from a mobile network operator (MNO); and forwarding the received update request message to the profile management server, wherein the profile is installed in a universal integrated circuit card (UICC) of a terminal, wherein the update request message is created if first information stored in a secured area of the profile installed in the UICC is modified to the second information, wherein the first information is configured to be modified using a unique encryption key of the MNO, and wherein the second information is not provided from the MNO to the profile management server before the update request message is forwarded from the profile creation server to the profile management server.

16. The method of claim 15, wherein the first information includes a first mobile subscriber issuer security domain number (MSISDN) and the second information includes a second MSISDN.

17. The method of claim 15, wherein the update request message includes at least one of the second information, a partial area of the profile including the second information, and the profile including the second information.

18. A profile creation server comprising:
a transceiver configured to transmit and receive a signal; and
a controller configured to:
  receive an update request message including second information for updating profile related information stored in a profile management server from a mobile network operator (MNO), and
  forward the received update request message to a profile management server,
  wherein a profile is installed in a universal integrated circuit card (UICC) of a terminal,
  wherein the update request message is created if first information stored in a secure area of the profile installed in the UICC is modified to the second information,
  wherein the first information is configured to be modified using a unique encryption key of the MNO, and
  wherein the second information is not provided from the MNO to the profile management server before the update request message is forwarded from the profile creation server to the profile management server.

19. The profile creation server of claim 18, wherein the first information includes a first mobile subscriber issuer security domain number (MSISDN) and the second information includes a second MSISDN.

20. The profile creation server of claim 18, wherein the update request message includes at least one of the second information, a partial area of the profile including the second information, and the profile including the second information.

* * * * *